(12) United States Patent
Johnson et al.

(10) Patent No.: US 10,431,987 B2
(45) Date of Patent: Oct. 1, 2019

(54) METHODS AND SYSTEMS FOR MAINTAINING PHOTOVOLTAIC POWER PLANT REACTIVE POWER CAPABILITY

(71) Applicant: SunPower Corporation, San Jose, CA (US)

(72) Inventors: Lars Johnson, Holladay, UT (US); Andrew Joseph Ponec, Fremont, CA (US)

(73) Assignee: SUNPOWER CORPORATION, San Jose, CA (US)

( * ) Notice: Subject to any disclaimer, the term of this patent is extended or adjusted under 35 U.S.C. 154(b) by 883 days.

(21) Appl. No.: 14/864,259

(22) Filed: Sep. 24, 2015

(65) Prior Publication Data
US 2017/0093163 A1    Mar. 30, 2017

(51) Int. Cl.
*H02J 3/38*      (2006.01)
*H02M 1/42*   (2007.01)
*H02M 7/44*   (2006.01)

(52) U.S. Cl.
CPC .............. *H02J 3/383* (2013.01); *H02M 1/42* (2013.01); *H02M 7/44* (2013.01)

(58) Field of Classification Search
CPC ........ H02J 13/002; H02J 13/0075; H02J 3/16; H02J 3/383; H02J 3/385; H02M 1/42; H02M 7/44; Y02E 10/58; Y02E 40/34; Y02E 40/72; Y02E 60/726;
(Continued)

(56) References Cited

U.S. PATENT DOCUMENTS 8,922,062 B2   12/2014   Johnson et al.
9,059,604 B2    6/2015   Johnson
(Continued)

FOREIGN PATENT DOCUMENTS

WO    WO 2017/053724 A1    3/2017

OTHER PUBLICATIONS

Notification of Transmittal of the International Search Report and the Written Opinion of the International Searching Authority, or the Declaration for International Patent Application No. PCT/US2015/053337 (Jan. 19, 2017).

*Primary Examiner* — Thienvu V Tran
*Assistant Examiner* — Brian K Baxter
(74) *Attorney, Agent, or Firm* — Jenkins, Wilson, Taylor & Hunt, P.A.

(57) ABSTRACT

Methods, systems, and computer readable media are disclosed for maintaining photovoltaic power plant reactive power capability, e.g., through the manipulation of direct current (DC) voltage. In some examples, A control system includes a monitor input for receiving a monitor signal indicative of an input voltage of an inverter system and a control output for outputting a control signal to a voltage-clipping device of a solar panel system supplying a solar output voltage to the inverter system. The control system includes a control circuit configured to perform operations comprising: determining, using the monitor signal, that the input voltage of the inverter system exceeds a threshold voltage; and in response to determining that the input voltage of the inverter system exceeds the threshold voltage, causing, using the control signal, the voltage-clipping device to reduce the solar output voltage by shorting out one or more photovoltaic solar cells of the solar panel system.

16 Claims, 6 Drawing Sheets

(58) Field of Classification Search
CPC ............ Y02E 60/7815; Y02E 60/7853; Y04S 10/123; Y04S 10/24; Y04S 40/121; Y04S 40/126
USPC .......................................................... 307/53
See application file for complete search history.

(56) References Cited

U.S. PATENT DOCUMENTS

| | | | |
|---|---|---|---|
| 2010/0308662 A1* | 12/2010 | Schatz | H02J 3/385 307/80 |
| 2011/0197945 A1* | 8/2011 | Schaacke | H01L 31/02021 136/244 |
| 2011/0282600 A1 | 11/2011 | Roesner et al. | |
| 2012/0069602 A1* | 3/2012 | Escobar | G05F 1/67 363/13 |
| 2013/0018516 A1* | 1/2013 | Chee | H02J 3/383 700/287 |
| 2013/0048049 A1 | 2/2013 | Flanery | |
| 2013/0076144 A1 | 3/2013 | Agamy et al. | |
| 2013/0099580 A1 | 4/2013 | Borup et al. | |
| 2013/0106196 A1 | 5/2013 | Johnson et al. | |
| 2014/0265589 A1 | 9/2014 | Dally et al. | |
| 2015/0171628 A1* | 6/2015 | Ponec | H02J 1/00 307/77 |
| 2015/0349709 A1* | 12/2015 | Ponec | H02S 40/32 136/244 |
| 2016/0118803 A1* | 4/2016 | Takahashi | H02J 3/383 700/286 |
| 2018/0006579 A1* | 1/2018 | Matsuoka | H02J 3/38 |
| 2018/0123345 A1* | 5/2018 | Beebe | H02S 40/32 |

* cited by examiner

METHODS AND SYSTEMS FOR MAINTAINING PHOTOVOLTAIC POWER PLANT REACTIVE POWER CAPABILITY

BACKGROUND

The subject matter described in this specification relates generally to maintaining photovoltaic power plant reactive power capability, e.g., through the manipulation of direct current (DC) voltage.

Large photovoltaic power plants often need to provide reactive power support to an electric grid in order to meet interconnection agreement contracts for connecting to the electric grid. If a plant is not able to provide the reactive power support as specified, then the plant may be forced to disconnect from the electric grid. The plant can include various reactive power sources within the plant that can be used to provide the reactive power support, and one of the main components in providing reactive power support can be the DC to alternating current (AC) inverters. Some inverters are configured so that, when the DC voltage seen by the inverters exceeds a threshold, the inverter is unable to fulfill its full reactive power capability, which may jeopardize the interconnection reactive power capability.

Some inverter makes are configured to shutdown entirely when DC voltage at the inverter terminals is above a certain threshold. Other inverters reduce their reactive power capability in order to manage the DC voltage levels. Some plants include a controller configured to, when DC voltages reach high values causing some inverters to be curtailed in real power, find one or more inverters within a power plant that see the highest voltages within the plant and control those inverters to shut down. Then the real power curtailment set points to the remaining inverters in the plant can be increased and the plant can maintain the real power control at a desired level. However, such an approach can reduce the power plant reactive power capacity as it shuts down inverters.

SUMMARY

A control system includes a monitor input for receiving a monitor signal indicative of an input voltage of an inverter system and a control output for outputting a control signal to a voltage-clipping device of a solar panel system supplying a solar output voltage to the inverter system. The control system includes a control circuit configured to perform operations comprising: determining, using the monitor signal, that the input voltage of the inverter system exceeds a threshold voltage; and in response to determining that the input voltage of the inverter system exceeds the threshold voltage, causing, using the control signal, the voltage-clipping device to reduce the solar output voltage by shorting out one or more photovoltaic solar cells of the solar panel system.

The subject matter described in this specification may be implemented in hardware, software, firmware, or combinations of hardware, software and/or firmware. In some examples, the subject matter described in this specification may be implemented using a non-transitory computer readable medium storing computer executable instructions that when executed by one or more processors of a computer cause the computer to perform operations.

Computer readable media suitable for implementing the subject matter described in this specification include non-transitory computer-readable media, such as disk memory devices, chip memory devices, programmable logic devices, random access memory (RAM), read only memory (ROM), optical read/write memory, cache memory, magnetic read/write memory, flash memory, and application specific integrated circuits. In addition, a computer readable medium that implements the subject matter described in this specification may be located on a single device or computing platform or may be distributed across multiple devices or computing platforms.

DETAILED DESCRIPTION

Figure 1:
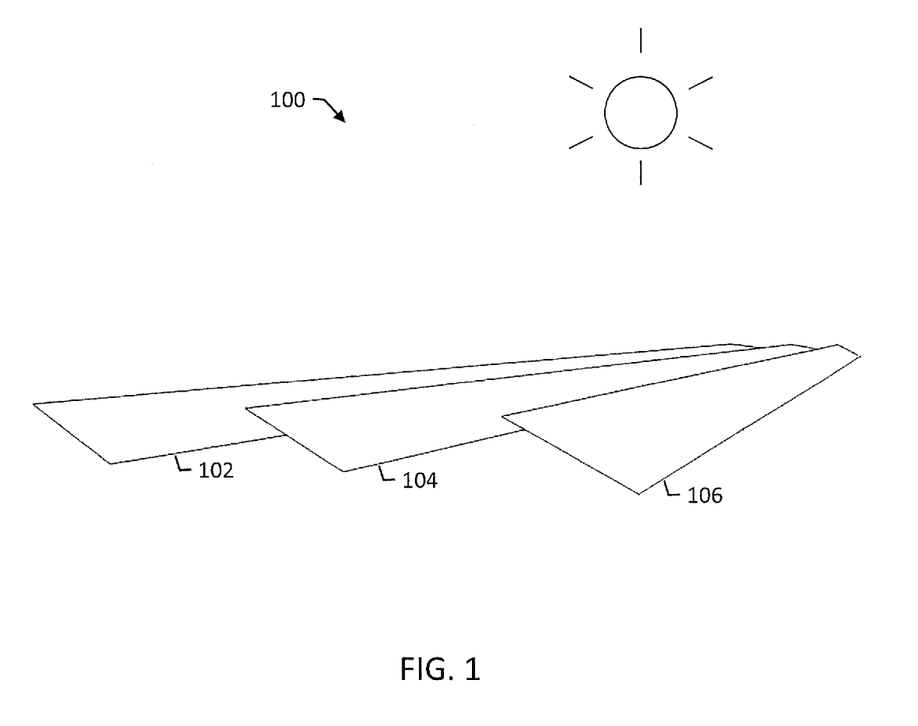
FIG. 1 illustrates an example solar power plant.

FIG. 1 illustrates an example solar power plant 100. The solar power plant 100 has an array of photovoltaic solar panels 102, 104, and 106. The photovoltaic solar panels 102, 104, and 106 include solar cells that generate electricity from solar radiation. A solar cell typically includes P-type and N-type diffusion regions. Solar radiation impinging on the solar cell creates electrons and holes that migrate to the diffusion regions, thereby creating voltage differentials between the diffusion regions. A photovoltaic inverter converts direct current generated by the solar cells to alternating current suitable for, e.g., coupling to a power grid at a point of interconnection (POI). The solar power plant 100 can regulate the grid voltage at the POI to be within a range of particular values to meet requirements.

Figure 2:
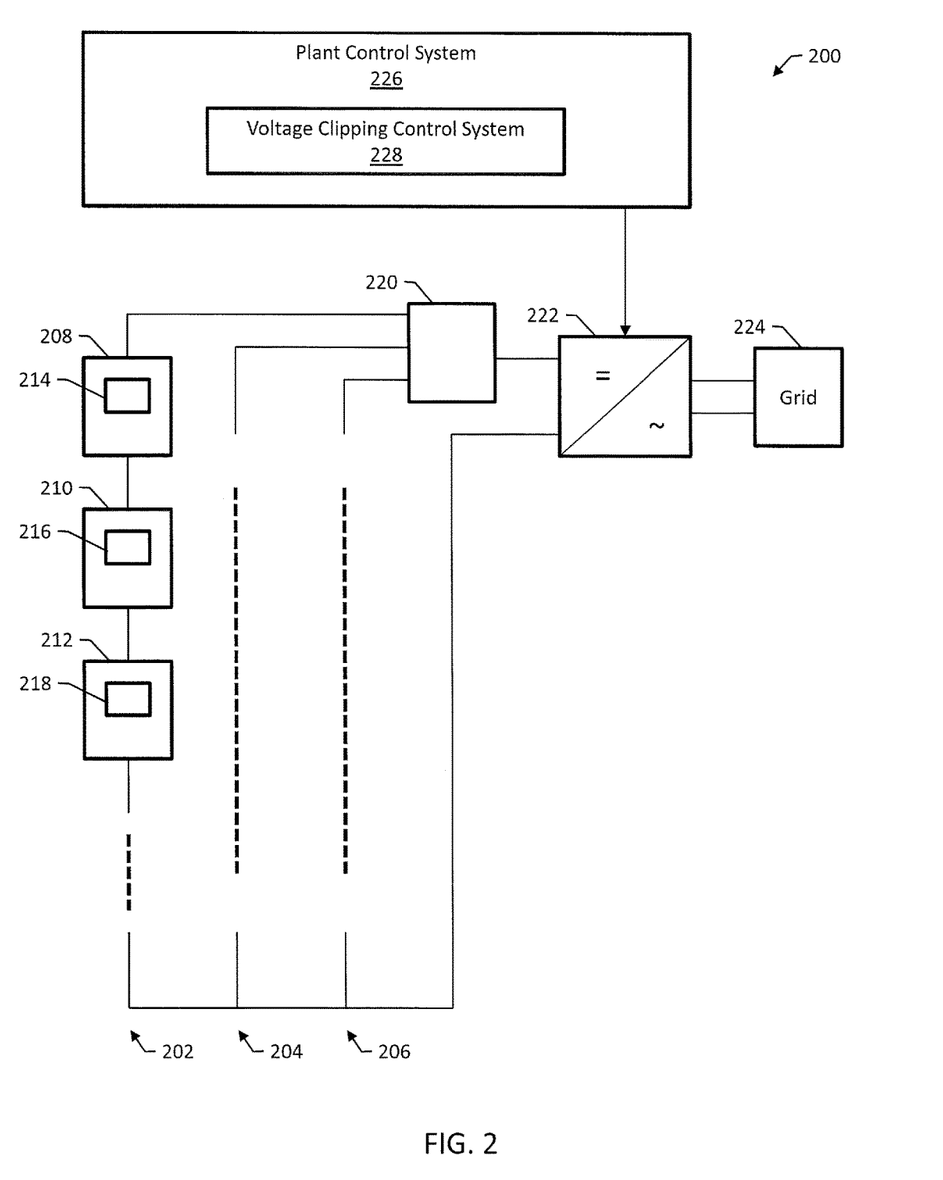
FIG. 2 is a block diagram of an example solar power plant.

FIG. 2 is a block diagram of an example solar power plant 200. The solar power plant 200 includes several strings of solar cells 202, 204, and 206, which can be housed in, e.g., the solar panels 102, 104, and 106 of FIG. 1. A string can include, e.g., several solar cells and/or photovoltaic modules of solar cells, which each photovoltaic module including solar cells mounted on a frame. In a typical string, the positive terminal of one solar cell is electrically connected to the negative terminal of another solar cell, the positive terminal of the other solar cell is electrically connected to the negative terminal of yet another solar cell, and so on.

The output voltage of a string depends on the number of solar cells in the string. The voltage of each solar cell or module adds to produce the voltage delivered by the string. For purposes of illustration, the first string 202 in FIG. 2 is shown in more detail that the other strings 204 and 206. The first string 202 includes a number of junction boxes 208, 210, 212, one for each solar cell or module in the string 202. A junction box is a container for electrical connections and is coupled to a solar cell or module. For example, a junction box can be a small metal or plastic box with electrical connectors.

The junction boxes 208, 210, and 212 each include a voltage-clipping device 214, 216, and 218. The voltage-clipping devices 214, 216, and 218 are configured to reduce the output voltage of the first string 202 by shorting out the solar cells or modules coupled to the respective junction boxes 208, 210, and 212. For example, a voltage-clipping device can include a field-effective transistor or any appropriate electrical switch to provide an alternate current path around a junction box, e.g., as described further below with reference to FIG. 3.

The strings 202, 204, and 206 are each coupled to a combiner box 220, which is an electrical device configured to receive the output voltages of the strings 202, 204, and 206 and add the voltages to provide a summed output voltage. For example, the strings 202, 204, and 206 can be electrically coupled in parallel at the combiner box 220. The combiner box 220 is coupled to an inverter system 222. The inverter system 222 converts the direct current output from the combiner box 220 into an alternating current output supplied to an electric grid 224, e.g., a utility grid. Although FIG. 2 illustrates the strings 202, 204, and 206 being coupled by a combiner box and then supplying a central inverter, in some examples, each string has a respective string inverter for the string and the outputs of the strings are coupled together after the string inverters.

The solar power plant 200 includes a plant control system 226. The plant control system 226 can be implemented using one or more computers configured, by virtue of appropriate programming, to monitor and control one or more aspects of the plant 200. For example, the plant control system 226 can be a supervisory control and data acquisition (SCADA) system configured to provide control of remote equipment in real-time and may include or be combined with a data acquisition system.

In some examples, the plant control system 226 can be configured to facilitate control of the voltage at or near the point of interconnection with the grid 224. For example, the plant control system 226 can control the voltage at the point of interconnection by manipulating a control signal in the form of an inverter reference voltage or other appropriate control signal.

The plant control system 226 can be configured to control the voltage at the point of interconnection using an automatic voltage regulation (AVR) routine. Generally speaking, AVR may involve manipulation of voltage clipping thresholds from the photovoltaic strings 202, 204, and 206, and by manipulating reactive (or power factor) set points at the inverter 222 to control the voltage at the point of interconnection with the distribution, transmission, or other electrical connection to the grid 224. AVR may also be employed to coordinate operation of the photovoltaic strings 202, 204, and 206 with reactive power sources, such as static VAR compensators and capacitive banks.

The plant control system 226 includes a voltage-clipping control system 228. The voltage-clipping control system 228 can be implemented using the same one or more computers as the plant control system 226 or on a different system of one or more computers which may be in communication with the one or more computers implementing the plant control system 226. The voltage-clipping control system 228 can be implemented using any appropriate combination of hardware, software, and/or firmware. In some examples, the voltage-clipping control system 228 is integrated with the inverter 222, with the strings 202, 204, and 206, or with another appropriate component of the solar power plant 200. The voltage-clipping control system 228 can be physically located remotely from the plant control system 226.

In operation, the voltage-clipping control system 228 controls the voltage-clipping devices 214, 216, and 218. The voltage-clipping control system 228 can provide control signals to the voltage-clipping devices 214, 216, and 218 using, e.g., wireless radios, power line communication systems, or any appropriate communication medium. The voltage-clipping control system 228 receives a monitor signal indicative of an input voltage of the inverter system 222.

The voltage-clipping control system 228 determines, using the monitor signal, whether or not the input voltage of the inverter system 222 exceeds a threshold voltage. The threshold voltage is based on the capability of the inverter system 222 to provide reactive power support to the grid 224. In general, the threshold voltage is the voltage that, when exceeded by the input voltage, the inverter system 222 loses or begins to lose its capability to provide reactive power support to the grid 224. The threshold voltage can be based on a contractual obligation to provide a specified reactive power support to the grid 224.

In some examples, the voltage-clipping control system 228 can modify the threshold voltage based on plant conditions, e.g., in response to receiving a control signal from a utility computer system or other grid computer system. If the inverter system 222 loses its capability of providing reactive power support to the grid 224, the solar power plant 200 may be forced to disconnect from the grid 224, which may cause the solar power plant operator to lose revenue and the grid 224 to source power from non-renewable sources.

When the voltage-clipping control system 228 determines that the input voltage exceeds the threshold voltage, the voltage-clipping control system 228 causes one or more voltage-clipping devices to reduce the output voltage from the strings 202, 204, and 206 by shorting out one or more solar cells of the strings 202, 204, and 206. The voltage-clipping control system 228 causes the voltage-clipping devices to reduce the output voltage by outputting control signals to the voltage-clipping devices. By reducing the input voltage seen at the inverter system 222, the inverter system 222 maintains its capability to provide reactive power support to the grid 224.

To illustrate the implementation and operation of the voltage-clipping control system 228, consider the following three examples. In a first example, the voltage-clipping control system 228 is implemented in a distributed manner at each of the voltage-clipping devices 214, 216, and 218 and is configured to operate without an explicit communication from the inverter system 222. As the inverter system 222 increases voltage (and decreases string current) for the plant 200, one or more of the voltage-clipping devices 214, 216, and 218 begin to reduce the string output voltage.

To prevent over-curtailment, the voltage-clipping devices 214, 216, and 218 each can be configured to respond to different clipping threshold voltages, so that as the inverter system 222 decreases current more and more voltage-clipping devices reduce the output voltage. Essentially, the inverter system 222 can send a signal through its voltage and current, even without other means of transmitting information, and the voltage-clipping control system 228 is configured to use the voltage and/or current to determine whether to reduce the output voltage or not.

In a second example, the voltage-clipping control system 228 is integrated with the inverter system 222 or receives direct commands from the inverter system 222. For example, the inverter firmware can be configured, by virtue of appropriate programming, to output a control signal to the voltage-clipping devices 214, 216, and 218, e.g., in addition to executing a maximum power point tracking (MPPT) algorithm. The inverter system 222 can send a signal, e.g., through a modulation of array voltage, or through the switching frequency of a main bridge. The voltage-clipping devices 214, 216, and 218 could be configured to respond to such a signal, e.g., by virtue of a bandpass filter and an amplifier.

In a third example, the voltage-clipping control system 228 is integrated with the plant control system 226 computer system or another computer system in communication with the plant control system 226, e.g., a tracker monitoring and control system (TMAC). The voltage-clipping control system 228 can use existing communication channels, e.g., of the SCADA system, to receive and send signals, e.g., a monitoring signal characterizing the voltage at the inverter system 222 and an output signal to the voltage clipping devices 214, 216, and 218. The amount of information needed to be transferred is potentially very small and could be sent in a broadcast transmission.

In the second and third examples, the plant control system 226 can balance the number of sub-strings that are shorted, which may create a more uniform and consistent string module voltage from one string to the next. The MPPT algorithm may be able to maintain a more consistent global MPPT point with fewer local maxima points. Balancing may result in a more consistent, smooth, or more linear reduction in voltage. The second and third examples, however, may involve added complexity in communication schemes. The increased costs of added complexity can be mitigated, e.g., by supplementing only some of the voltage-clipping devices 214, 216, and 218 with communication equipment.

Figure 3:
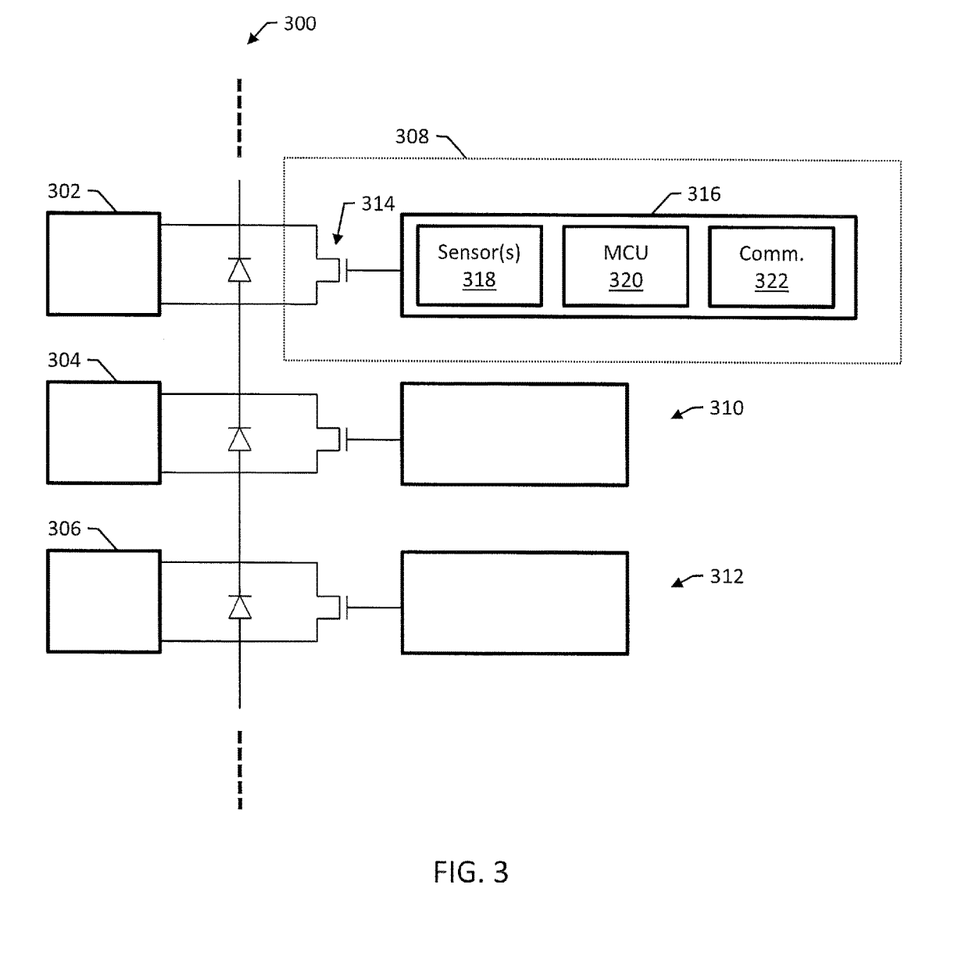
FIG. 3 is a diagram of an example photovoltaic string.

FIG. 3 is a diagram of an example photovoltaic string 300. The string 300 includes a number of sub-strings 302, 304, and 306, which can each be a solar cell or a module of one or more solar cells. The string 300 includes voltage-clipping devices 308, 310, and 312 for the sub-strings 302, 304, and 306. For purposes of illustration, the first voltage-clipping device 308 is shown in more detail than the other two 310 and 312.

The first voltage-clipping device 308 includes a field effect transistor 314 and a local controller 316. Although a field effect transistor 314 is shown, any appropriate electric switch can be used. The local controller 316 can be implemented in any appropriate combination of hardware, software, and/or firmware. In some examples, the local controller 316 includes one or more sensors 318, e.g., current and/or voltage sensors; a microcontroller 320, which can be configured by virtue of appropriate programming to control the field effect transistor 314; and a communications module 322, e.g., a power line communications device and/or a wireless radio.

In operation, the first voltage-clipping device 308 reduces the output voltage of the string 300 by closing the switch implemented by the field effect transistor 314. The first voltage-clipping device 308 applies an appropriate voltage to the gate of field effect transistor 314 to short out the first sub-string 302 by providing an alternate current path through the field effect transistor 314. The excess energy from the first sub-string 302 is shunted back into the sub-string 302 itself.

Figure 4A:
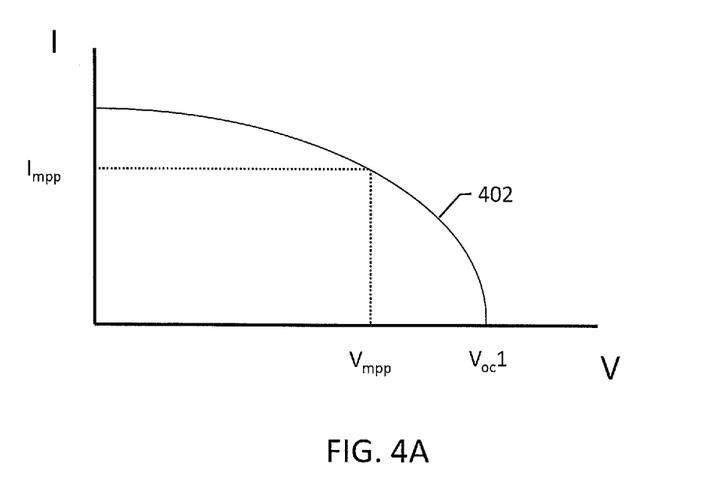
FIG. 4A is a chart illustrating an example I-V curve of a solar power system.

FIG. 4A is a chart illustrating an example I-V curve 402 of a solar power system. The I-V curve 402 represents a range of currents and voltages that may be seen by the input of an inverter system. When no current is flowing, the voltage is at its highest at the open circuit voltage, $V_{oc}1$. The inverter system, in executing a MPPT algorithm, can select the point along the curve that maximizes the output power of the system, which is shown in the diagram by $I_{mpp}$ and $V_{mpp}$.

Figure 4B:
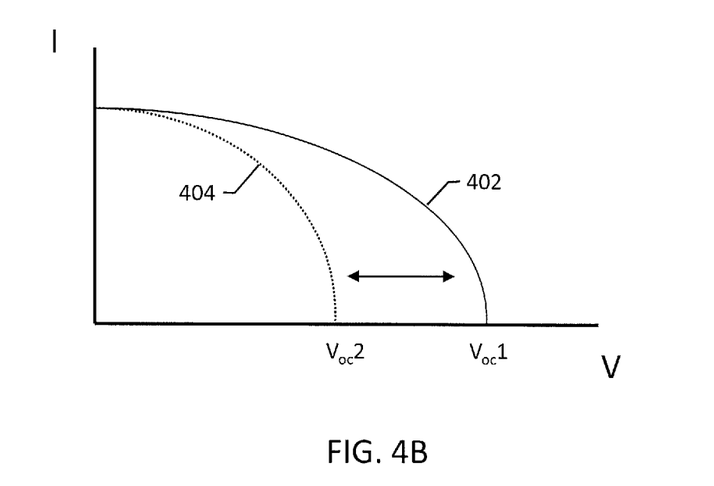
FIG. 4B is a chart illustrating an example shifted I-V curve.

FIG. 4B is a chart illustrating an example shifted I-V curve 404. When one or more voltage-clipping devices short out one or more solar cells of the solar power system, the first I-V curve 402 shifts left to the second I-V curve 404, which reduces the open circuit voltage to Voc2. Shifting the I-V curve to the left using voltage-clipping devices can reduce the voltage seen at the inverter system, which can maintain the inverter system's capability to provide reactive power support to an electric grid.

Figure 5:
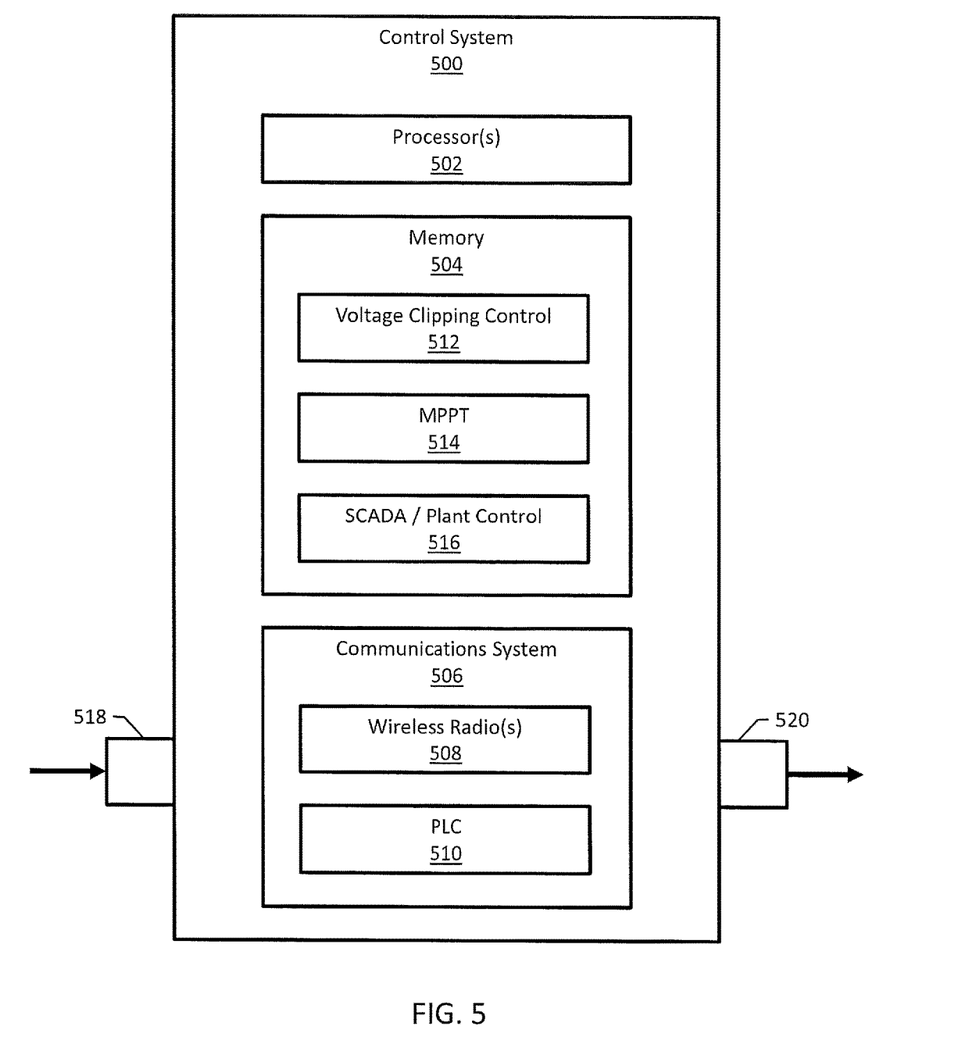
FIG. 5 is a block diagram of an example voltage-clipping control system.

FIG. 5 is a block diagram of an example voltage-clipping control system 500. The voltage-clipping control system 500 includes one or more processors 502 and memory 504 storing executable instructions for the one or more processors 502. The voltage-clipping control system 500 also includes a communications system 506, which can include, e.g., one or more wireless radios 508 and/or a power line communications device 510.

The voltage-clipping control system 500 includes a voltage clipping control routine 512. In operation the voltage clipping control routine 512 receives a monitor signal indicative of an input voltage of an inverter system; determines whether the input voltage of the inverter system exceeds a threshold voltage; and in response to determining that the input voltage of the inverter system exceeds the threshold voltage, outputs a control signal to cause a voltage-clipping device to reduce a solar output voltage supplied to the inverter by a solar panel system by shorting out one or more photovoltaic solar cells of the solar panel system. The voltage-clipping control system 500 includes an input 518 for receiving the monitor signal and an output 520 for outputting the control signal.

In some examples, the voltage-clipping control system 500 is integrated with an inverter system and includes a MPPT algorithm 514. In some examples, the voltage-clipping control system 500 is integrated with a plant control system or other SCADA system and includes executable software for the SCADA system or plant control 516.

Although the voltage-clipping control system 500 is illustrated as a digital circuit implemented using the processors 502 and memory 504, the voltage-clipping control system 500 can be implemented using any appropriate control circuitry. For example, an analog comparator could be used to compare the monitor signal with a reference signal.

Figure 6:
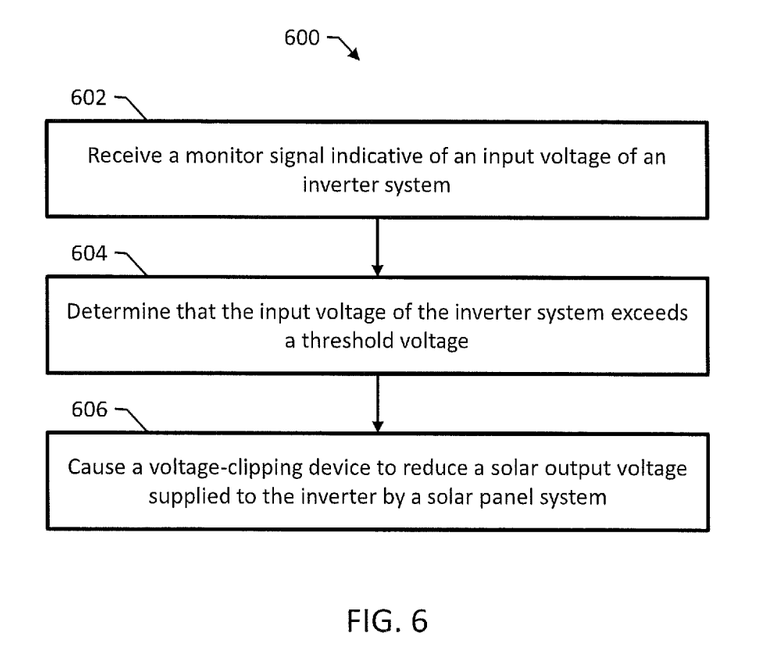
FIG. 6 is a flow diagram of an example method performed by a control system.

FIG. 6 is a flow diagram of an example method 600 performed by a control system. The control system receives a monitor signal indicative of an input voltage of an inverter system 602. For example, determining that the input voltage of the inverter system exceeds the threshold voltage can include monitoring an output voltage of the inverter system or an output current of the inverter system or both.

The control system determines whether the input voltage of the inverter system exceeds a threshold voltage 604. In response to determining that the input voltage of the inverter system exceeds the threshold voltage, the control system outputs a control signal to cause a voltage-clipping device to reduce a solar output voltage supplied to the inverter by a solar panel system by shorting out one or more photovoltaic solar cells of the solar panel system 606. For example, outputting the control signal can include outputting the control signal using one or more of: a wireless radio configured to communicate wirelessly with the voltage-clipping device, and a power line communication (PLC) circuit configured to communicate with the voltage-clipping device over a power line.

In some examples, the control system is integrated into the inverter system and configured to execute a MPPT algorithm for the inverter system. In those examples, causing the voltage-clipping device to reduce the solar output voltage can include modulating an output voltage of the inverter system or an output current of the inverter system or both. Causing the voltage-clipping device to reduce the solar output voltage can include modulating a switching frequency of a main bridge of the inverter system.

In some examples, the control system is integrated into a solar power plant control system or a tracker monitoring and control (TMAC) system for the solar panel system. The method 600 can include communicating with the voltage-clipping device using a SCADA system.

Although specific examples and features have been described above, these examples and features are not intended to limit the scope of the present disclosure, even where only a single example is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A control system comprising:
a monitor input for receiving a monitor signal indicative of an input voltage of an inverter system, wherein the inverter system is configured to provide a specified amount of reactive power to a point of interconnection with an electric grid;
a control output for outputting a control signal to a voltage-clipping device of a solar panel system supplying a solar output voltage to the inverter system; and
a control circuit configured to perform operations comprising:
determining, using the monitor signal, that the input voltage of the inverter system exceeds a threshold voltage; and
in response to determining that the input voltage of the inverter system exceeds the threshold voltage, causing, using the control signal, the voltage-clipping device to reduce the solar output voltage by shorting out one or more photovoltaic solar cells of the solar panel system, wherein the threshold voltage is selected so that reducing the solar output voltage reduces the input voltage of the inverter system below an inverter threshold at which, if exceeded, the inverter system cannot supply the specified amount of reactive power; wherein the control circuit is configured to cause the voltage-clipping device to reduce the solar output voltage by modulating an output voltage of the inverter system or an output current of the inverter system or both.

2. The control system of claim 1, wherein determining that the input voltage of the inverter system exceeds the threshold voltage comprises monitoring an output voltage of the inverter system or an output current of the inverter system or both.

3. The control system of claim 1, wherein the control output for outputting the control signal to the voltage-clipping device of the solar panel system is integrated into the inverter system, and wherein the control system is configured to execute a maximum power point tracking algorithm for the inverter system.

4. The control system of claim 3, wherein the control circuit is configured to cause the voltage-clipping device to reduce the solar output voltage by modulating a switching frequency of a main bridge of the inverter system.

5. The control system of claim 1, wherein the control output comprises one or more of: a wireless radio configured to communicate wirelessly with the voltage-clipping device, and a power line communication (PLC) circuit configured to communicate with the voltage-clipping device over a power line.

6. A method comprising:
receiving, by a control system, a monitor signal indicative of an input voltage of an inverter system, wherein the inverter system is configured to provide a specified amount of reactive power to a point of interconnection with an electric grid;
determining, by the control system using the monitor signal, that the input voltage of the inverter system exceeds a threshold voltage; and
in response to determining that the input voltage of the inverter system exceeds the threshold voltage, causing, by the control system outputting a control signal, a voltage-clipping device to reduce a solar output voltage supplied to the inverter by a solar panel system by shorting out one or more photovoltaic solar cells of the solar panel system, wherein the threshold voltage is selected so that reducing the solar output voltage reduces the input voltage of the inverter system below an inverter threshold at which, if exceeded, the inverter system cannot supply the specified amount of reactive power; wherein causing the voltage-clipping device to reduce the solar output voltage comprises modulating an output voltage of the inverter system or an output current of the inverter system or both.

7. The method of claim 6, wherein determining that the input voltage of the inverter system exceeds the threshold voltage comprises monitoring an output voltage of the inverter system or an output current of the inverter system or both.

8. The method of claim 6, wherein the control output for outputting the control signal to the voltage-clipping device of the solar panel system is integrated into the inverter system, and wherein the method comprises executing a maximum power point tracking algorithm for the inverter system.

9. The method of claim 8, wherein causing the voltage-clipping device to reduce the solar output voltage comprises modulating a switching frequency of a main bridge of the inverter system.

10. The method of claim 6, wherein the control system is integrated into a solar power plant control system, and wherein the method comprises communicating with the voltage-clipping device using a supervisory control and data acquisition (SCADA) system.

11. The method of claim 10, wherein the control system is integrated into a tracker monitoring and control (TMAC) system for the solar panel system.

12. The method of claim 6, wherein outputting the control signal comprises outputting the control signal using one or more of: a wireless radio configured to communicate wirelessly with the voltage-clipping device, and a power line communication (PLC) circuit configured to communicate with the voltage-clipping device over a power line.

13. A system comprising:
- an inverter system configured to provide a specified amount of reactive power to a point of interconnection with an electric grid;
- a solar panel system supplying a solar output voltage to the inverter system;
- a plurality of voltage-clipping devices for the solar panel system; and
- a control circuit configured to perform operations comprising:
  - determining that an input voltage of the inverter system exceeds a threshold voltage; and
  - in response to determining that the input voltage of the inverter system exceeds the threshold voltage, causing, by outputting a control signal, at least a first voltage-clipping device to reduce the solar output voltage by shorting out one or more photovoltaic solar cells of the solar panel system, wherein the threshold voltage is selected so that reducing the solar output voltage reduces the input voltage of the inverter system below an inverter threshold at which, if exceeded, the inverter system cannot supply the specified amount of reactive power; wherein the control system is integrated into a solar power plant control system and configured to communicate with the voltage-clipping device using a supervisory control and data acquisition (SCADA) system.

14. The control system of claim 13, wherein the control system is integrated into a tracker monitoring and control (TMAC) system for the solar panel system.

15. The system of claim 13, wherein the control circuit is configured to store a respective threshold voltage for each voltage-clipping device and is configured to cause each voltage-clipping device to reduce the solar output voltage in response to determining that the input voltage of the inverter system exceeds the respective threshold voltage for the voltage-clipping device.

16. The system of claim 13, wherein the solar panel system comprises a plurality of strings of photovoltaic solar cells, and wherein the control circuit is configured to reduce the solar output voltage by balancing the voltage-clipping devices reducing the solar output voltage across the strings of photovoltaic solar cells.

* * * * *